Patented May 18, 1948

2,441,860

UNITED STATES PATENT OFFICE 2,441,860

ACCELERATED CURING OF PHENOL-FORMALDEHYDE RESINS TO THE INFUSIBLE STATE WITH 3,5-XYLENOL

Richard R. Whetstone, Berkeley, Calif., assignor to Shell Development Company, San Francisco, Calif., a corporation of Delaware No Drawing. Application November 16, 1943, Serial No. 510,562

9 Claims. (Cl. 260—57)

This invention relates to the use of 3,5-xylenol as a curing accelerator for resins produced by the reaction of a compound containing an active methylene group, such as an aldehyde, with a phenolic body.

Phenols can be reacted with aldehydes by heating in the presence of a catalyst. The condensation products first formed are fusible, water-soluble substances. The products of further reaction are fusible, but insoluble in water and, generally, in common organic solvents. Completing the condensation results in infusible, insoluble resins.

The process of converting a fusible condensation product into an infusible state is known as hardening or curing. The rate and extent of curing can be increased by the presence of certain substances, such as resorcinol and phloroglucinol, which act as curing promoters.

It is an object of the present invention to provide a new curing promoter for phenol-aldehyde-type resins. Another object is to provide a new, faster method for curing phenol-aldehyde-type resins. Another object is the production of improved resins by the reaction of a phenolic body with a compound containing an active methylene group. Other objects will be apparent from the description of the invention given hereinafter.

These objects are accomplished by curing phenol-aldehyde-type resins in the presence of 3,5-xylenol. In accordance with the preferred procedure of the invention, a fusible resin is produced by reacting a phenolic body with a compound containing an active methylene group. The fusible resin is then mixed with 3,5-xylenol and cured. The rate of curing is faster than with most of the curing promoters previously generally used and the finished resin is superior in color-stability and other physical properties to otherwise similar resins cured with the fastest prior-art promoters of which we are aware.

Substantially all thermosetting phenol-aldehyde-type resins are operable in accordance with the invention. The resins can be produced by reacting a phenolic substance with a compound containing an active methylene group, preferably in the presence of a catalyst.

Among the many suitable phenolic substances are phenol, 3-methyl phenol, 2-methyl phenol, 2,3-dimethyl phenol, 2,3,5-trimethyl phenol, 2-tolyl phenol, 2-methyl-3-ethyl phenol, 2,5-dimethyl phenol, 2-isopropyl phenol, 2-tertiary butyl phenol, 2-secondary amyl phenol, 4-methyl phenol, 4-(tertiary butyl) phenol, 4-(secondary amyl) phenol, 3,4-dimethyl phenol, 3-methyl-4-isopropyl phenol, phenols substituted by relatively long chain substantially hydrocarbon radicals, as illustrated by cardanol, a constituent of heat-treated cashew nut shell liquid, and the naphthols. Low-boiling phenols, i. e. phenols boiling below about 225° C., produce the most desirable products. Phenol itself is preferred. A single phenolic reactant can be used, or two or more phenolic reactants can be used in conjunction with one another.

Aldehydes, ketones, polymers thereof, and compounds regenerating aldehydes and ketones under the reaction conditions employed are among the compounds containing an active methylene group which can be used as reactants. Suitable aldehydes may be saturated aliphatic compounds, such as formaldehyde, acetaldehyde, propionaldehyde, butyraldehyde and valeraldehyde; unsaturated aliphatic compounds, such as acrolein; cyclic compounds, such as furfural; or aromatic compounds, such as benzaldehyde. Formaldehyde, which is the preferred aldehyde by reason of its reactivity and low cost, can be used in its polymeric state (paraformaldehyde), or in solution in water, e. g. formalin, or in other solvents. A single compound containing an active methylene group can be used as the reactant, or two or more such compounds can be used in admixture with one another.

The ratio of phenolic reactants to aldehyde-type reactants can be varied over a wide range. In general, when the ratio on the basis of equivalent weights is less than 1:1, the products are really capable of infusibilization by heat. As the ratio increases above 1:1, the products generally become less capable of infusibilization by heat. This property is, however, dependent also upon other factors, particularly upon the nature of the catalyst. The ratio of phenolic reactants to aldehyde-type reactants can be as large as about 3:1 or as small as about 1:4, or even less, on the basis of equivalent weights. Ratios of from about 1:1 to about 1:4 are preferred. It is sometimes desirable to have present during the first part of the reaction only a portion of the full amount of one or both reactants to be used, adding the remainder at one or more points in the course of the reaction.

Acidic and basic substances can be used to catalyze the reaction. With acids, the condensation reaction is more easily controlled, particularly with respect to stopping the reaction at the desired point, but the products are inclined to be less capable of conversion to strong, infusible resins than the corresponding products produced by condensation in the presence of alkalies.

Substantially any stable, non-reactive acid can be used as a catalyst. Inorganic acids, such as hydrochloric, sulfuric, phosphoric, etc., acids, are effective. Organic acids, such as acetic, lactic, phthalic, etc., acids, can be used.

Fixed inorganic bases, as represented by alkali and alkaline earth metal oxides, hydroxides and the like, are commonly used as catalysts. Ammonia, or ammonium hydroxide, can be used in the production of heat-hardenable resins. Among other catalytic compounds are organic bases, such as hexamethylenetetramine, aniline and other amines.

More than one catalyst can be used, if desired. A modified procedure consists in catalyzing the first part of the condensation with an acid, and subsequently condensing under alkaline conditions. In this way, heat-hardenable resins can be produced while maintaining a maximum degree of control over the reaction. The reverse procedure can, of course, be employed, i. e., the reaction mixture can be initially alkaline and, subsequently, be made acidic.

The amount of catalyst employed depends upon the particular reactants involved, upon the presence of inert diluents, upon the nature of the catalyst itself, upon the various conditions under which the reaction is conducted, upon the nature and intended use of the desired product and upon many other factors. Amounts of sodium hydroxide catalyst as small as about 0.1% of the combined weight of phenolic and aldehyde-type reactants have proved suitable. Amounts as great as about 5% can be used. The pH of the reaction mixture can be varied from about pH 2 to about pH 12, although the more narrow range of about pH 5 to about pH 10 is preferred.

The reaction can be conducted in the absence of inert diluents. Nevertheless, many advantages accrue to the use of homogenizing liquid diluents, which sometimes serve to bring the reactants and/or catalysts into more intimate contact with one another and act as heat-transfer media.

Depending upon the mutual solubilities of the ingredients thereof, and upon the manner of combination of the ingredients, the reaction mixture may be a solution, collodial dispersion, impermanent suspension or emulsion. Agitation is preferably provided. The reaction can be carried out in a continuous or batchwise manner under atmospheric, superatmospheric or reduced pressures. Conducting the reaction in the absence of oxygen, e. g. under a blanket of an inert gas, such as nitrogen or carbon dioxide, assists in minimizing color formation, as does also the use of glass or stainless steel equipment.

The reaction is energized by heat. Temperatures of from about 50° C. to about 200° C. are satisfactory, although lower or higher temperatures can be employed, the upper limit of temperature being dependent principally upon the tendency of the ingredients of the reaction mixture to become decomposed or degraded with heat. Once the reaction has been initiated, the exothermic heat of the reaction may be sufficient to maintain the required temperature. In some cases, positive cooling may be necessary.

In accordance with the usual procedure, the reaction is stopped while the resinous product is still fusible. When the reaction is stopped after having been allowed to proceed only a relatively short time, the resin may be soluble in water. When the reaction has been allowed to proceed for a longer-time, the product may be a water-insoluble resin, soluble in acetone and other organic liquids. In some cases, the resin may be insoluble in many common organic solvents.

The resin can, if desired, be freed from the other ingredients of the reaction mixture and purified. Volatile substances, such as water, can be removed by evaporation, if necessary, under reduced pressure. Solvent extraction can be used. Drying can be promoted by hygroscopic agents. Acidic or basic catalysts can be neutralized. In some cases, however, the resin need not at this point be isolated and purified but can be used in admixture with the other ingredients of the reaction mixture in subsequent operations more fully described hereinafter. Where such separation and purification of the resin are not required, deliberate suspension of the reaction at the point at which the desired fusible resin has been produced is sometimes unnecessary.

3,5-xylenol can be combined with the fusible resin by any of a variety of processes. Milling on rolls, mixing in Banbury mixers or screw stuffers, and precipitation of the resin from a common solvent for the resin and 1,3,5-xylenol are but illustrations of known general methods. The xylenol can be added to the resinous reaction mixture before the separation of the resin therefrom, or it can be added to the separated resin. The resin and xylenol should usually be intimately and homogeneously admixed.

The amount of 3,5-xylenol used as a hardening agent in accordance with the invention is preferably between about 0.2% and about 10% by weight of the phenol used in the production of the resin. Amounts less than the smaller figure have too slight an effect to make the deliberate addition of the agent worthwhile as a practical measure. When more than the larger amount is used, the resin is ordinarily too brittle to be of value. The narrower range of from about 0.5% to about 5% of xylenol by weight of the resin is preferred, since within this range the agent is very effective and at the same time the properties of the resins are usually not significantly impaired.

Fusible phenol-aldehyde-type resins are usually subjected to one or more shaping operations before being cured. Shaping is usually effected after the resin has been admixed with 3,5-xylenol, although in some cases it can be effected previously thereto. The resins alone, or in admixture with solvents, swelling agents and the like, can be used in sizing and impregnating woven or felted textiles. They can be used with textiles and with bibulous material of many other kinds in the production of laminated articles. They can be applied as coatings to paper, cloth, wood, glass, brick, stone, cement, plaster and synthetic surfaces. They can be caused to assume the shape of a mold. They can be extruded. In these and in the many other shaping operations to which the resins can be adapted it may often be desirable to make use of one or more modifying agents in addition to solvents and swelling agents. For instance, for use in molding the resins are generally admixed with fillers.

Shaping can be effected with the aid of heat and pressure. Use can be made of any apparatus suitable for the particular operation involved, e. g. compression molding machines, injection molding machines, extruders, milling rolls, calender rolls, etc.

Curing of the shaped resin comprises completing the resinous condensation. Temperatures at least as high as those used in the first step are generally required. Temperatures of from about 80° C. to about 300° C. are suitable under the proper conditions. Temperatures of about 150° C. are preferred. Atmospheric or superatmospheric pressures are usual, although reduced pressures can be used. The curing processes can be carried out in a continuous or discontinuous manner. In some cases the second step of condensation (curing) occurs concomitantly with the shaping of the resin, as, for example, when the resin is shaped under heat and pressure in a mold.

The resins with which the invention is concerned can be modified by the addition of plasticizers, solvents, pigments, fillers, dyes, stabilizers, lubricants and plastic substances of many kinds. Examples of typical fillers are asbestos, wood flour, paper, pulp, sand, clay, mica and cotton flock. Representative of plastic substances which can be used as modifiers are many natural resins, such as rosin, dammar gum, and shellac; rubber; synthetic condensates, such as alkyd and urea-aldehyde-type resins; and synthetic polymerizates.

Resins prepared according to the invention can be used in coating compositions, as adhesives and cements. They can be used as binders in the production of laminated articles, particularly laminated articles comprising fabric or paper laminae. Molded articles can be made from them with or without the addition of fillers. The compositions comprising the resins can be used as impregnants and sizes for textile materials. Phonograph records, films, filaments, threads, abrasive articles, floor coverings, and the like can be prepared from compositions containing the resins.

The following examples are given for the purpose of illustrating the invention. Parts are on a weight basis.

Example I

Phenol, 94 parts, and formaldehyde, 75 parts, were refluxed for 30 minutes in the presence of .42 part of sodium hydroxide as a 30% aqueous solution. The resinous product was dehydrated by heating under reduced pressure. The resulting resin was mixed with 5 parts of 3,5-xylenol per 100 parts of resin. The mixture was poured into a mold and cured by being heated for a day and a half at about 70° C.

A resin was prepared and cured in exactly the same way except that no 3,5-xylenol was added. Curing required 3½ days.

A resin produced in accordance with the description in the first paragraph containing 5 parts phloroglucinol instead of 5 parts of 3,5-xylenol required 2 days for curing.

Example II

A phenol-aldehyde resin was produced by reacting phenol, 97 parts, with formaldehyde, 75 parts, under reflux conditions in the presence of a small amount of aqueous sodium hydroxide as catalyst. The resinous product was dehydrated under reduced pressure. The product was mixed with 2% of 3,5-xylenol, poured into a mold and heated at 65° C. The resin required 2 days to cure.

Example III

A mixture of phenol, 89 parts, and 3,5-xylenol, 6 parts, was condensed with formaldehyde, 60 parts, in the presence of a small amount of sodium hydroxide in aqueous solution under reflux conditions. The solution was dehydrated under reduced pressure. The resulting fusible resin was mixed with 5 parts of 3,5-xylenol per 100 parts of resin. The mixture was poured into a mold and cured at 65° C. to 75° C. The time required for curing was 2 days.

A resin similarly prepared without the use of additional 3,5-xylenol prior to curing required 3 days for the completion of the cure.

A fusible resin produced from the same materials and in the same manner as described in the first paragraph of the present example was mixed with 5 parts of phloroglucinol per 100 parts of resin. The mixture was cured in a mold at about 70° C. Curing required 3 days.

Example IV

A mixture of 53.6 parts of formalin, 23.5 parts of phenol and 2.5 parts of a 10% aqueous sodium hydroxide solution was refluxed for an hour and a half, following which the reaction mixture was just acidified with 10% aqueous lactic acid. 20 parts of absolute ethyl alcohol were then added and the mixture was dehydrated with gentle heating under reduced pressure (3 cm. of mercury). When the temperature reached 60° C., 5 grams of glycerine were added. When the temperature reached 85° C., the process of dehydration was arrested.

10 parts of the resulting resin were mixed with 1.25 parts of 3,5-xylenol. A sheet of the composition approximately 4 mm. thick between glass plates was baked in an oven at 68° C. to 70° C. The Barcol hardness after 7 days was 40.

Another portion of 10 parts resin was mixed with 0.26 part of 3,5-xylenol and cured between glass plates. The Barcol hardness at the end of 10 days was 43.

Another portion of the resin was mixed with 0.15 part of 3,5-xylenol and cured between glass plates at 68° C. to 70° C. in an oven. At the end of 10 days the Barcol hardness was 30. A sample of the resin not containing a curing agent had a Barcol hardness of only 30 after 11 days of heating.

Another 10 grams sample of the resin was mixed with 0.26 part of resorcinol. The mixture was cured between glass plates approximately 4 mm. apart in an air oven at 68° C. to 70° C. After 10 days Barcol hardness was only 32.

3,5-xylenol is the compound otherwise known as 3,5-dimethyl phenol. Other xylenols, such as 2,3-dimethyl phenol and 3,4-dimethyl phenol, are substantially ineffective as curing agents for phenol-aldehyde resins in comparison with 3,5-xylenol.

I claim as my invention:

1. A process for accelerating the curing of a thermo-setting resin obtained by heating phenol and formaldehyde in the presence of sodium hydroxide which comprises mixing the resin which has been partially cured only to the fusible state with from 0.5 to 5% by weight of 3,5-xylenol based upon the weight of said resin, and heating the mixture at a temperature of from 50 to 300° C. until the curing is substantially complete with formation of the infusible resin.

2. An infusible resin prepared by mixing a thermo-setting resin obtained by heating phenol and formaldehyde in the presence of sodium hydroxide, which thermo-setting resin has been partially cured only to the fusible state with 0.5 to 5% by weight of 3,5-xylenol based upon the weight of said resin, and heating the mixture at a temperature of from 50 to 300° C. until the curing is substantially complete with formation of the infusible resin.

3. A process for accelerating the curing of a phenol-aldehyde resin which comprises mixing 3,5-xylenol with a thermo-setting resin obtained from the reaction by heating in the presence of a base of phenol and formaldehyde in an amount of from 0.2 to 10% by weight of the xylenol based on the phenol contained in the thermo-setting resin, which thermo-setting resin has been partially cured only to the fusible state at the time of said mixing, and heating the mixture at a temperature of 50 to 300° C. until substantially infusibilized.

4. A process for accelerating the curing of a thermo-setting fusible resin obtained by heating phenol with formaldehyde in the presence of a base, which comprises mixing fusible resin with 0.5 to 5% by weight of 3,5-xylenol based upon the weight of said fusible resin, and heating the mixture at 50 to 300° C. until curing is substantially complete with conversion to the infusible resin.

5. An infusible resin prepared by mixing 0.5 to 5% of 3,5-xylenol with a thermo-setting fusible resin obtained by heating phenol with formaldehyde in the presence of a base, the percentage being by weight and based upon the weight of said fusible resin, and heating the mixture at 50 to 300° C. until curing is substantially complete with conversion to the infusible resin.

6. A process for accelerating the curing of a thermo-setting fusible resin obtained by heating phenol with 1 to 4 equivalent weights of formaldehyde in the presence of 0.1 to 5%, based upon the total weight of said phenol and formaldehyde, of sodium hydroxide until the reaction mixture has become dehydrated but the resin is still fusible, which comprises mixing said fusible resin with 0.5 to 5% by weight of 3,5-xylenol based upon the weight of said fusible resin, and heating the mixture at 50 to 300° C. until curing is substantially complete with conversion to the infusible resin.

7. An infusible resin prepared by mixing 0.5 to 5% of 3,5-xylenol with a thermo-setting fusible resin obtained by heating phenol with 1 to 4 equivalent weights of formaldehyde in the presence of 0.1 to 5%, based upon the total weight of said phenol and formaldehyde, of sodium hydroxide until the reaction mixture has become dehydrated but the resin is still fusible both percentages being by weight with the former being based upon the weight of said resin and the latter upon the total weight of said phenol and formaldehyde, and heating the mixture at 50 to 300° C. until curing is substantially complete with conversion to the infusible resin.

8. A process for accelerating the curing of a thermo-setting fusible resin obtained by heating 94 parts by weight of phenol with 30 parts by weight of formaldehyde in the presence of 0.42 part by weight of sodium hydroxide until the reaction mixture has become dehydrated but while the resin is still fusible, which comprises mixing said fusible resin with 5% by weight of 3,5-xylenol based upon the weight of said fusible resin, and heating the mixture at 70° C. until curing is substantially complete with conversion to the infusible resin.

9. An infusible resin prepared by mixing 3,5-xylenol with the thermo-setting fusible resin obtained by heating 94 parts by weight of phenol with 30 parts by weight of formaldehyde in the presence of 0.42 part by weight of sodium hydroxide until the reaction mixture has become dehydrated but while the resin is still fusible in an amount of 5% by weight of 3,5-xylenol based upon the weight of said fusible resin, and heating the mixture at 70° C. until the curing is substantially complete with conversion to the infusible resin.

RICHARD R. WHETSTONE.

REFERENCES CITED

The following references are of record in the file of this patent:

UNITED STATES PATENTS

| Number | Name | Date |
| --- | --- | --- |
| 2,375,964 | Turkington et al. | May 15, 1945 |

FOREIGN PATENTS

| Number | Country | Date |
| --- | --- | --- |
| 467,234 | Great Britain | June 10, 1937 |